US007070624B2

(12) United States Patent
Holmes, III et al.

(10) Patent No.: US 7,070,624 B2
(45) Date of Patent: Jul. 4, 2006

(54) PROCESS FOR SEPARATING POLYESTER FROM OTHER MATERIALS

(75) Inventors: John Mitchell Holmes, III, Spartanburg, SC (US); Richard Philip Zink, Spartanburg, SC (US)

(73) Assignee: United Resource Recovery Corporation, Spartanburg, SC (US)

( * ) Notice: Subject to any disclaimer, the term of this patent is extended or adjusted under 35 U.S.C. 154(b) by 176 days.

(21) Appl. No.: 10/174,760

(22) Filed: Jun. 19, 2002

(65) Prior Publication Data

US 2003/0010680 A1 Jan. 16, 2003

Related U.S. Application Data

(60) Provisional application No. 60/299,273, filed on Jun. 19, 2001.

(51) Int. Cl.
*D06M 11/00* (2006.01)
*C08F 12/02* (2006.01)
*C08L 27/12* (2006.01)
*C08J 11/04* (2006.01)

(52) U.S. Cl. .................. 8/130; 8/115.51; 209/172; 521/48; 525/199; 526/67; 528/489

(58) Field of Classification Search .............. 521/48; 8/115.51, 130; 209/172; 528/489; 525/199; 526/67
See application file for complete search history.

(56) References Cited

U.S. PATENT DOCUMENTS

| | | | |
|---|---|---|---|
| 2,927,130 A | 3/1960 | Schütt | |
| 3,047,435 A | 7/1962 | Wemple | |
| 3,120,561 A | 2/1964 | Chambert | |
| 3,215,735 A | 11/1965 | Sakuri et al. | |
| 3,257,335 A | 6/1966 | Whitfield, Jr. et al. | |
| 3,400,187 A | 9/1968 | Farrow | |
| 3,503,904 A | 3/1970 | Dietz et al. | |
| 3,544,622 A | 12/1970 | England | |
| 3,579,572 A | 5/1971 | Amedjian et al. | |
| 3,594,414 A | 7/1971 | Katzschmann | |
| 3,647,422 A | 3/1972 | Wainer | |
| 3,652,466 A | 3/1972 | Hittel et al. | |
| 3,873,314 A | 3/1975 | Woo et al. | |
| 3,873,609 A | 3/1975 | Wu et al. | |
| 3,884,850 A | 5/1975 | Ostrowski | |
| 3,928,253 A | 12/1975 | Thornton et al. | |
| 3,952,053 A | 4/1976 | Brown, Jr. et al. | |
| 3,953,502 A | 4/1976 | Fassell et al. | |
| 3,956,088 A | 5/1976 | Fassell et al. | |
| 4,033,907 A | 7/1977 | Wolf | |
| 4,078,143 A | 3/1978 | Malik et al. | |
| 4,163,860 A | 8/1979 | Delattre et al. | |
| 4,189,242 A | 2/1980 | Luke | |
| 4,201,871 A | 5/1980 | Tanouchi et al. | |
| 4,212,774 A | 7/1980 | Idel | |
| 4,250,331 A | 2/1981 | Shimsick | |
| 4,320,979 A | 3/1982 | Lucke | |
| 4,324,705 A | 4/1982 | Seto et al. | |
| 4,345,098 A | 8/1982 | Schep | |
| 4,355,175 A | 10/1982 | Pusztaszeri | |
| 4,368,274 A | 1/1983 | Scott | |
| 4,392,889 A | 7/1983 | Grout | |
| 4,578,502 A | 3/1986 | Cudmore | |
| 4,578,510 A | 3/1986 | Doerr | |
| 4,602,046 A | 7/1986 | Buser et al. | |
| 4,605,762 A | 8/1986 | Mandoki | |
| 4,612,057 A | 9/1986 | Buser et al. | |
| 4,617,111 A | 10/1986 | Grimm et al. | |
| 4,620,032 A | 10/1986 | Doerr | |
| 4,626,598 A | 12/1986 | Packer et al. | |
| 4,629,780 A | 12/1986 | Schoenhard | |
| 4,898,912 A * | 2/1990 | Siol et al. | 525/199 |
| 5,064,466 A | 11/1991 | Hilton | |
| 5,095,145 A | 3/1992 | Rosen | |
| 5,120,768 A | 6/1992 | Sisson | |
| 5,234,110 A | 8/1993 | Kobler | |
| 5,248,041 A | 9/1993 | Deiringer | |
| 5,254,666 A | 10/1993 | Benzaria | |
| 5,286,463 A | 2/1994 | Schwartz, Jr. | |
| 5,366,998 A | 11/1994 | Schwartz, Jr. | |
| 5,395,858 A | 3/1995 | Schwartz, Jr. | |
| 5,580,905 A | 12/1996 | Schwartz, Jr. | |

(Continued)

FOREIGN PATENT DOCUMENTS

DE 10032899 A1 1/2002

(Continued)

*Primary Examiner*—Douglas McGinty
*Assistant Examiner*—Preeti Kumar
(74) *Attorney, Agent, or Firm*—Dority & Manning, P.A.

(57) ABSTRACT

The present invention is directed to a process for separating polyester, and particularly polyethylene terephthalate, from various contaminants and impurities. In general, the process includes the steps of mixing materials containing polyester with an alkaline composition in a mixer. The mixer imparts sufficient energy to the slurry to provide substantially complete, even coating of the polyester containing materials with the alkaline composition and cause saponification of the outer surface of the polyester with the alkaline composition. After reaction in the mixer, the mixture is heated causing some of the impurities to be chemically modified into a more separable form. After heating, the mixture can be washed with water and the polyester can be easily separated from the remaining impurities. Through the process of the present invention, polyester can be separated and recovered from waste materials such as those containing polyvinyl chloride and aluminum. The process is also effective at removing coatings adhered to the polyester and at removing entrained organic and inorganic compounds contained within the polyester.

41 Claims, No Drawings

U.S. PATENT DOCUMENTS

| | | |
|---|---|---|
| 5,958,987 A | 9/1999 | Schwartz, Jr. et al. |
| 6,147,129 A | 11/2000 | Schwartz, Jr. |
| 6,197,838 B1 | 3/2001 | Schwartz, Jr. et al. |
| 6,369,173 B1 * | 4/2002 | Kim et al. .................... 526/67 |

FOREIGN PATENT DOCUMENTS

| | | |
|---|---|---|
| EP | 0550979 A2 | 7/1993 |
| GB | 610135 | 10/1948 |

* cited by examiner

PROCESS FOR SEPARATING POLYESTER FROM OTHER MATERIALS

CROSS REFERENCE TO RELATED APPLICATION

This application claims priority to an earlier filed U.S. provisional patent application Ser. No. 60/299,273 filed Jun. 19, 2001 entitled, "Process for Separating Polyester from other Materials."

BACKGROUND OF THE INVENTION

Polyesters are polymeric materials made from the esterification of polybasic organic acids with polyhydric acids. Perhaps the most commonly made and used polyester is polyethylene terephthalate (PET), which can be manufactured by reacting terephthalic acid with ethylene glycol.

Polyesters are currently being used in increasing amounts in various applications. For instance, polyesters are commonly used to make all types of containers such as beverage and food containers, photographic films, X-ray films, magnetic recording tapes, electrical insulation, surgical aids such as synthetic arteries, fabrics and other textile products, and other numerous items.

Because polyesters can be remelted and reformed, many efforts are underway to recycle as much polyester as possible after use. Before polyesters can be recycled, however, it is necessary to separate the post-consumer polyesters from other products and materials that may be found mixed with or coupled with the polyester. Unfortunately, many problems have been encountered in attempting to separate polyester from other waste materials. In particular, many prior art processes are not capable of efficiently or economically recovering polyester when a significant amount of impurities and contaminants are present. Most prior art processes for separating polyesters from other materials have been limited to floatation separation techniques and mechanical recovery processes.

In floatation separation techniques, polyesters are separated from other materials based on density differences. For instance, materials containing polyester can be combined with water, in which polyester is known to sink. The less dense materials, which float in water, can thus be easily separated from the submerged polyester. This procedure is relatively simple and very effective in separating polyesters from specific low density impurities. Floatation separation techniques, however, cannot be used if the polyester is found in combination with materials that sink in water or that have densities comparable to that of polyester.

For instance, post consumer polyester is typically mixed with polyvinyl chloride (PVC) and aluminum, which are not water buoyant. In fact, PVC has a density that is very similar to the density of PET and is often misidentified as PET. Both aluminum and PVC must be separated from polyester before it can be reused. In particular, if PET and PVC are remelted together, hydrochloric acid gases are produced which destroy the properties of the resulting plastic material.

In the past, in order to separate PET from PVC using a floatation separation technique in a specific gravity bath, others have attempted to modify the surface of the PVC so that the PVC will float in an aerated aqueous medium. For instance, in U.S. Pat. No. 5,234,110 to Kobler and U.S. Pat. No. 5,120,768 to Sisson various processes for separating PET from PVC flakes are disclosed. In these processes, the surface of the PVC flakes is treated in a manner so that the surface of the PVC is more likely to adhere to air bubbles when placed in an aqueous medium. In order for these processes to be efficient, however, the PVC flakes must have a high surface area to volume ratio. Consequently, the above processes are deficient in separating PVC chips from PET when the PVC chips have a large interior volume.

Besides failing to separate polyesters from heavier-than-water impurities, floatation separation techniques also fail to remove coatings that are commonly adhered to polyester. For example, polyester containers are commonly coated with vapor barrier coatings, saran coatings, and/or inks.

Mechanical recovery processes as used herein are washing processes used to strip specific binder and adhesive layers off polyester films without substantial reaction occurring between the polyester and the wash solution. For example, U.S. Pat. Nos. 5,286,463 and 5,366,998 both to Schwartz, Jr., both of which are incorporated herein by reference thereto, disclose a composition and process for removing adhesives, particularly polyvinylidene halide and polyvinyl halide based resins, from polyester films, such as photographic films. In one embodiment, the polyester films are mixed with a reducing sugar and a base to remove the adhesive polymeric resin from the film. An acid is then added to precipitate the resin, which can then be separated from the polyester film.

U.S. Pat. No. 4,602,046 to Buser et al. discloses a method for the recovery of polyester from scrap material such as photographic film having a polyester base and at least one layer of macromolecular organic polymer. Specifically, scrap material is cut or chopped into small individual pieces or flakes and treated in a caustic alkaline solution at a solids level of at least 25% by volume and under conditions of high shear. The organic polymer coating material is removed from the polyester flakes. The polyester flakes are then separated from the polymer coating material by filtration or centrifugation, rinsed in water, and dried. The recovered polyester flakes can be used as a feed stock for making films, bottles or other polyester articles. A method and apparatus for recovering silver and plastic from used film is also disclosed in U.S. Pat. No. 4,392,889 to Grout. In this method, the used film is first passed through a bath preferably comprising a hot caustic solution for precipitating silver layered on the film. The film then passes through a second bath of hot caustic until an adhesive sheet disposed on the film has been dissolved. Typically, the adhesive sheet is made of polyvinylidene chloride, which adheres the silver to the film. After a second caustic bath, the film is dried and available for use.

Other processes for recovering polyester from photographic films are disclosed in U.S. Pat. No. 3,928,253 to Thornton et al., U.S. Pat. No. 3,652,466 to Hittel et al., U.S. Pat. No. 3,647,422 to Wainer, and U.S. Pat. No. 3,873,314 to Woo et al.

As shown above, mechanical recovery processes have generally been limited to use with photographic films. In recycling the photographic films, silver is also recovered making the processes economically viable. Mechanical recovery processes, although very successful at removing the emulsion-type coatings found on photographic films, have generally not been successful in removing other types of coatings from polyesters. For instance, most of these processes are not capable of efficiently removing some of the vapor barrier coatings and inks that are applied to polyesters.

Other contaminants that are generally not removable from polyesters using floatation separation techniques and mechanical recovery processes as described above are entrained organic and inorganic compounds. These contaminants include, for instance, gasoline, kerosene, motor oil, toluene, pesticides and other compounds that are absorbed by polyesters when placed in contact therewith. If the entrained organic and inorganic compounds are not substantially removed from the polyester materials during recycling, the recycled polyesters cannot be used as food containers or as beverage containers.

Because of the above noted deficiencies in prior art processes, large amounts of recyclable polyesters are being scrapped and loaded into landfills or are being incinerated. Unfortunately, not only is the polyester not being reused, but the polyester materials are creating a waste management and disposal problem.

Recently, the focus of recovering polyester from the waste stream has changed from mechanical washing processes to chemically converting the polyester into usable chemical components. For instance, in U.S. Pat. No. 5,958,987, 6,147,129, and 6,197,838, all to Schwartz, Jr., which are incorporated herein by reference thereto, processes for recycling polyesters in which a portion of the polyesters are reduced to their original chemical reactants are disclosed. The processes include the steps of combining the polyester materials with an alkaline composition to form a mixture. The mixture is heated to a temperature sufficient to convert the surface of the polyester to an alkaline salt of a polybasic organic acid and a polyol.

The above described patents represent great advancements in the art. The process of the present invention is directed to further improvements in processes for recycling polyesters.

SUMMARY OF THE INVENTION

In general, the process of the present invention is directed to a process for separating a polyester substrate from various contaminants and impurities. For example, the process of the present invention can be used to release various contaminants from a polyester substrate to which the contaminants have been coupled, i.e. either adhered or entrained contaminants. Additionally, the process of the present invention can facilitate the separation of polyester from other contaminants which can be mixed with polyester in the waste stream; aluminum and polyvinyl chloride, for example.

The process of the present invention generally includes mixing materials containing polyester with an alkaline composition to form a slurry. The slurry can then be mixed in a high energy mixer which can not only substantially and evenly coat the materials with the alkaline composition, but can also impart sufficient energy so as to promote reaction between the materials and the alkaline composition which can enable separation of the polyester from various contaminants and impurities. For example, the slurry can be mixed in a high energy plow mixer. In one embodiment, the mixer can operate at a Froude number greater than about 4.2 to promote the reaction. Specifically, the mixer can operate at a Froude number greater than about 6.6. In one embodiment, the mixer can operate at a Froude number greater than about 9.5.

In general, the alkaline composition can be a metal hydroxide solution. For example, the metal hydroxide can be sodium hydroxide, calcium hydroxide, potassium hydroxide, lithium hydroxide, magnesium hydroxide, or mixtures thereof. In one embodiment, the alkaline composition can be formed of only sodium hydroxide and water. For example, the alkaline composition can be sodium hydroxide and water in a 1:1 ratio.

The alkaline composition can be combined with the polyester materials in an amount so as to saponify as little of the polyester as possible and yet still promote separation of the polyester from any contaminants or impurities. For example, the alkaline composition can be combined with the polyester materials in an amount of less than about 10% by weight of the polyester materials. Specifically, the alkaline composition can be combined with the polyester materials in a stoichiometric amount sufficient to react with less than about 20% of the polyester. More specifically, the alkaline composition can be combined with the polyester materials in a stoichiometric amount sufficient to react with less than about 10% of the polyester.

The reaction process can substantially exhaust the metal hydroxide in the mixer. For example, the metal hydroxide remaining in the slurry after the mixing and reaction process can generally be less than about 1% of the weight of the slurry. Specifically, the metal hydroxide remaining in the slurry after the mixing and reaction process can generally be less than about 0.5% of the weight of the slurry. More specifically, the metal hydroxide remaining in the slurry after the mixing and reaction process can generally be less than about 0.1% of the weight of the slurry.

If desired, the slurry can be heated after the reaction in the mixer is substantially complete. For example, the slurry can be heated to a first temperature, such as, for example, a temperature of between about 120° C. and about 170° C., to dry the slurry and produce a dry product, and then heated to a second temperature, such as, for example a temperature of between about 200° C. and about 240° C., which can further degrade the contaminants and make them easier to separate from the polyester substrate.

In one embodiment, the polyester containing materials can include contaminants which are coupled to the polyester substrate, such as contaminants which are entrained in the polyester or contaminants which are adhered to the surface of the polyester. In this embodiment, the alkaline composition can react with the materials during mixing and cause saponification of a portion of the polyester which can release the contaminants from the surface of the polyester substrate.

Alternatively, the polyester containing materials can include impurities or contaminants which are mixed with the polyester, though not necessarily coupled to the polyester, such as polyvinyl chloride or aluminum materials, for example. In this embodiment, the alkaline composition can react with the contaminant and cause them to be altered into a form which is more easily separable from the polyester. For example, polyvinyl chloride can be dechlorinated by the alkaline composition in which form it can be easily separated from the polyester substrate.

DETAILED DESCRIPTION OF THE PREFERRED EMBODIMENT

The present invention is generally directed to a process for recovering and separating polyesters from various contaminants and impurities. For instance, through the process of the present invention, various contaminants can be released from a polyester substrate such as various coatings including vapor barrier coatings, inks, and saran coatings as well as other contaminants which are entrained within the outer surface of the polyester substrate, such as various volatile organic and inorganic contaminants. During the process, the polyester can be partially saponified but largely remain in polymer form and the contaminants can be physically released from the polyester substrate.

The process is also directed to the separation and recovery of polyester when mixed with other types of impurities such as polyvinyl chloride and aluminum, for example. During the process, the impurities can be converted into a form which is more easily separable from the polyester substrate.

As used herein, a polyester is defined as an esterification or reaction product between a polybasic organic acid and a polyol. It is believed that any known polyester or copolyester may be used in the process of the present invention. The process of the present invention is particularly directed to a class of polyesters referred to herein as polyol polyterephthalates, in which terephthalic acid serves as the polybasic organic acid.

As used herein, a polybasic organic acid refers to any organic acid having two or more carboxyl groups (—COOH). Most polyesters are derived from dibasic acids or, in other words, from dicarboxylic acids. Polybasic acids can have a linear or a cyclic conformation. Examples of linear polybasic acids that can be used to make polyesters include the aliphatic dicarboxylic acids. In particular the aliphatic dicarboxylic acids having up to ten carbon atoms in their chains can be used. These acids include adipic acid, glutaric acid, succinic acid, malonic acid, oxalic acid, pimelic acid, suberic acid, azelaic acid, sebacic acid, maleic acid, and fumaric acid.

Cyclic polybasic organic acids, on the other hand, include the carbocyclic dicarboxylic acids. These acids are known as phthalic acid, isophthalic acid, and terephthalic acid. In particular, terephthalic acid is used to make polyethylene terephthalate, which is perhaps the most commercially available polyester.

As described above, a polybasic organic acid is combined with a polyol to produce a polyester. Polyols are compounds that contain at least two hydroxyl groups. Many polyesters are synthesized using a polyol that contains two hydroxyl groups, which are referred to as diols. Diols are normally prepared from an alkene by the net addition of two hydroxy groups to the double carbon bond in a method known as hydroxylation. Polyols are commonly referred to as glycols and polyhydric alcohols. Examples of polyols used to make polyesters include ethylene glycol, propylene glycol, butylene glycol, and cyclohexane dimethanol.

For exemplary purposes, the following table contains a nonexhaustive list of commercially available polyesters that may be recovered and recycled according to the present invention. For each polyester, the corresponding polybasic organic acid and polyol are provided.

| POLYESTER | POLYBASIC ORGANIC ACID | DIOL |
| --- | --- | --- |
| Polyethylene Terephthalate | Terephthalic Acid | Ethylene Glycol |
| Polybutylene Terephthalate | Terephthalic Acid | Butylene Glycol |
| PETG Copolyester | Terephthalic Acid | Cyclohexane-dimethanol and Ethylene Glycol |
| PBTG Copolyester | Terephthalic Acid | Cyclohexane-dimethanol and Butylene Glycol |
| Polycyclohexane-dimethanol Terephthalate | Terephthalic Acid | Cyclohexane-dimethanol |
| PEN Polyester | Napthalene Dicarboxylic Acid | Ethylene Glycol |

In general, the process of the present invention includes first combining materials containing polyester with a selected amount of an alkaline solution to form a slurry in a mixer. The mixer chosen is one which can not only provide substantially complete and even coating of the polyester materials by the alkaline solution, but also can impart sufficient energy to cause a portion of the polyester to saponify, or, in other words, to hydrolyze. During saponification, various coatings that may be adhered to the polyester and/or other contaminants which may be entrained within the surface of the polyester can be released from the polyester. The energy provided from the mixer can also promote reaction between the alkaline solution and other impurities which can be mixed in with the polyester in the slurry, such as polyvinyl chloride or aluminum, for example, such that the impurities can be converted to another form, one which is more easily separable from the polyester substrate. After the reaction within the mixer, the slurry can then be heated, usually in a two-step heating process.

The process of the present invention can run continuously or can be set up as a batch system. Practically any material containing a polyester can be processed by the present invention including but not limited to, for example, beverage and food containers, photographic and X-ray films, recording tapes, insulation materials, textile fibers and other products. Preferably, the polyester materials are recovered from the solid waste stream, thus alleviating many environmental concerns and disposal problems. The present invention is particularly directed to recycling food containers and beverage containers made from PET. Through the process of the present invention, polyesters can be separated, recovered and reused from post consumer waste, even when the polyesters are found mixed with polyvinyl chloride or aluminum, adhered to various coatings, or entrained with various organic and inorganic compounds. Such materials are currently being disposed of in landfills or are being incinerated after use due to a lack of an economical process that will recover the polyester.

Prior to being contacted with the alkaline composition, the materials containing the polyester can be, if desired, chopped or ground into a particular size. Sizing of the materials is done solely for the purpose of facilitating handling. Generally speaking, the larger the size of the materials and the less surface area to volume ratio, the less saponification of the polyester will occur later in the process. Consequently, smaller dimensions should be avoided and the size of the materials should be left as large as practicable. However, it should be understood that all different sizes and shapes of material may be used within the process of the present invention and no one size or shape is required.

Also prior to being combined with the alkaline composition, the materials containing the polyester can be immersed in water or some other fluid in order to separate the less dense or lighter materials from the heavier materials containing the polyester. More particularly, it is known that polyester sinks in water while paper products and other polymers, such as polyolefins, are water buoyant. Thus, the lighter materials can be easily separated from the heavier materials when contacted with a fluid. Subjecting the materials to a sink/float separation step prior to contacting the materials with the alkaline composition not only can reduce the quantity of materials being processed but also can clean the surface of the materials prior to further processing.

After being sized and subjected to a sink/float separation, if desired, the polyester containing materials can be combined and mixed with an alkaline composition to form a slurry, or mixture. Preferably, an alkaline solution can be combined with the materials so as to coat the material surface. In some applications, the material surface can resist uniform coating due to surface tension interaction. In this situation, the alkaline solution has a tendency to "bead up" on the material surface. The process of the present invention, however, as described below, can overcome this problem.

In accordance with the present invention, it has been discovered that an improved mixing process can be employed which can not only coat the polyester materials with the alkaline solution more completely and evenly, but in addition can impart sufficient energy to the mixture to cause saponification of the outside surface of the polyester to occur within the mixer. For example, mixers such as those described in U.S. Pat. No. 4,320,979 to Lucke and U.S. Pat. No. 4,189,242 to Luke, which are herein incorporated in their entirety by reference thereto, may be employed for coating of the polyester materials and saponification of at least a portion of the polyester with an alkaline solution.

The alkaline compound selected for mixing with the materials is preferably sodium hydroxide, known commonly as caustic soda. Other metal hydroxides and alkalines however, can be used. Such compounds include calcium hydroxide, magnesium hydroxide, potassium hydroxide, lithium hydroxide or mixtures thereof. The alkaline compound can be added to the polyester materials in solution, if desired. For instance, in one embodiment, a metal hydroxide, such as sodium hydroxide, can be mixed with water in about a 1:1 ratio to form the alkaline composition.

The amount of the alkaline composition added to the materials containing the polyester will depend upon the type and amount of impurities and contaminants present within the materials. Generally, the alkaline composition should be added only in an amount sufficient to separate the impurities from the polyester, so as to minimize the saponification of the polyester. In most applications, the alkaline composition is added to the materials in a stoichiometric amount sufficient to react with up to about 50% of the polyester. For example, the alkaline composition can be added in an amount sufficient to react with less than about 20% of the polyester. Specifically, the alkaline composition can be added in an amount sufficient to react with about less than about 15% of the polyester. More specifically, the alkaline composition can be added in an amount sufficient to react with less than about 10% of the polyester.

One of the benefits of the present invention is the ability of the mixer to coat the polyester material without the need of a wetting agent. In the past, a surfactant or wetting agent was often employed in order to facilitate the mixing of the alkaline composition with the polyester materials. Due to the improved mixing of the present invention, the use of a wetting agent is no longer necessary.

In one embodiment of the present invention a reactor in the form of a mixer can be utilized. In one particular embodiment, a plow mixer can be used. For example, a plow mixer such as those available from the Lödige Company, the Littleford Day Company, or other known companies can be used. In one particular embodiment, a mixer such as the Littleford Day KM-4200 mixer can be utilized. This particular mixer is available from the Littleford Day Company of Florence, Ky. Besides a plow mixer, however, it should be understood that various other high energy mixers can be used. Similarly, it should be understood that the process can be run as either a continuous or a batch process. An amount of ground or chopped polyester material can be added to the mixer after any desired pretreatment processes have been performed, such as, for example, the floatation separation processes as previously discussed. An alkaline solution can then be added to the mixer with the polyester material. For example, a alkaline solution of 50% NaOH and 50% water can be added to the mixer in an amount up to about 20% by weight of the material containing the polyester, and particularly in an amount less than about 10% by weight of the material containing the polyester.

The mixer can be operated at a rate which can impart sufficient energy to the mixture so as to substantially evenly coat the polyester material with the alkaline mixture and promote saponification of the outside surface of the polyester material such that most of the alkaline reactant is exhausted in the mixer. In general, mixers can normally be operated at a preset rotational speed, specific to the particular device and adapted to the particular process. In order to maintain equivalent energy input when using different mixers, the dimensionless value Fr (Froude number) is introduced, instead of the rotational speed. Fr is a dimensionless number which describes the ratio of inertial forces to gravitational forces. The Froude number can be described by the following formula:

$$Fr=V^2/(gL)$$

wherein Fr is the Froude number, V is the velocity, g is the gravitational acceleration, and L is a characteristic length.

In one embodiment of the present invention, the mixer can be operated at a Froude number greater than about 4.2, particularly greater than 6.6, and more particularly greater that about 9.5. Specifically, at the above rates, the mixer of the present invention not only mixes the slurry but also imparts sufficient energy to the slurry to cause the alkaline composition to react with the polyester. In fact, mixing can be continued until substantially all of the alkaline composition has been exhausted. For example, the mixer can be operated such that residual (unreacted) metal hydroxide exiting the mixer can be less than about 1% by weight of the slurry. Specifically, residual metal hydroxide exiting the mixer can be less than about 0.5% by weight. More specifically, residual metal hydroxide can be less than about 0.1% by weight of the slurry.

In the past, the saponification reaction occurred after heat was added to the mixture in a heater or kiln. Addition of heat to the mixture prior to reaction, however, can cause some of the alkaline solution to evaporate and thus can require addition of supplementary alkaline compounds to ensure suitable reaction levels. Additionally, the alkaline compound could become anhydrous during the heating processes. Thus, low oxygen and very dry processing conditions were preferred. The present invention avoids these problems by limiting the amount of caustic supplied to the dryer and/or kiln.

Another of the benefits of the present invention is the increased efficiency of the reaction process. For example, in one embodiment of the present invention a 10% by weight 50% sodium hydroxide/water solution can be added to the mixer with suitably prepared PET material. After sufficient mixing at a Froude number of approximately 6.6, about 13% of the PET can react with the caustic in the mixer. Use of the mixer of the present invention can not only substantially exhaust the alkaline composition within the mixer, but can also lower the amount of the alkaline composition required for the process due to more complete coating of the materials during mixing. Lower amounts of alkaline composition required for the process can mean not only less of the alkaline compound required in the process, but also lower the water requirements for the process.

The saponification reaction can convert the polyester into a polyol and an acid salt. For instance, when polyethylene terephthalate is reacted with sodium hydroxide, the reacted polyester can be converted to ethylene glycol and disodium terephthalate. It is believed that due to the completeness of mixing as well as the substantially even coating of alkaline supplied to the polyester materials in the mixer, the formation of the salt can form a coating on the polyester materials which exit the mixer. For example, in an embodiment wherein the outer surface of PET is saponified in the mixer with a sodium hydroxide solution, it is believed that the disodium terephthalate reaction product can coat the remaining PET. Unexpectedly, it has been discovered that such a coating formed around a polyester piece can serve to protect the polyester during later processing processes. For example, the salt coating can protect the polyester from oxidation due to high temperature conditions encountered later in the process. Among other benefits, this can provide a polyester product with less discoloration than that obtained in the past.

After exiting the mixer, the slurry can be heated. When heated, the slurry is preferably heated indirectly such that it does not contact an open flame. Heating the slurry can dry the polyester and the remaining impurities and can cause the loose, dried impurities to be degraded into a more easily separable form in order to facilitate final separation of the impurities from the polyester product.

The actual temperature to which the slurry can be heated can depend upon a number of factors. In general, heating can include more than one heating step. A preferred heating sequence in this regard includes heating to a temperature of 120–170° C. so as to dry the polyester, followed by heating, after drying, to a temperature of 200–240° C. in an environment that can be substantially free of water.

The equipment and apparatus used during the process of the present invention can vary. Thus far, good results have been obtained when the saponified slurry is heated in a rotary kiln. In order to provide a two-step heating process, the kiln can first be heated to the lower temperature for a desired period of time and then the temperature can be increased to the higher level. Alternatively, the slurry exiting the mixer can first be heated in a dryer, such as, for example, a ConAir dryer, before being transferred to a kiln for the higher temperature heating step. The rotary kiln can be heated by an electrical element, by heated oil or by fossil fuel burners. One example of a suitable indirectly heated kiln for use in the process of the present invention is the Rotary Calciner marketed by the Renneburg Division of Heyl & Patterson, Inc. It is believed, however, that a multidisc thermal processor or an oven will work equally as well. Of course, many other similar devices are available which may be used in the process of the present invention.

Although not required, the slurry can also be heated in an oxygen-starved environment. As used herein, oxygen starved refers to an environment in which oxygen is present below about 19% by volume. Maintaining lower oxygen levels during the heating phase prevents the polyester from being degraded and also protects against uncontrolled combustion. In one embodiment, the mixture can be heated in an inert atmosphere, such as in the presence of a nitrogen blanket. If desired, the mixture can also be heated at reduced pressures, which correspond to lower oxygen levels.

As described above, the process of the present invention is particularly directed to separating polyester from polyvinyl chloride, aluminum, coatings adhered to the polyester, and entrained organic and inorganic compounds. The particular steps involved in separating each of the above impurities according to the process of the present invention will now be discussed.

When polyvinyl chloride is present within the materials, during the process of the present invention the polyvinyl chloride can be converted into a form that floats in water and is heat resistant. It is believed that when the polyvinyl chloride is mixed with the alkaline composition and energy is added in the mixer, the alkaline composition can cause the polyvinyl chloride to dechlorinate, resulting in a darker colored material that is water buoyant and has a higher melting point than the chlorinated PVC. Consequently, when polyvinyl chloride is present in the materials, enough alkaline composition can be added sufficient to substantially dechlorinate the polyvinyl chloride or, in other words, to convert the polyvinyl chloride into a form separable from the polyester. However, even if not all of the PVC is contacted with an alkaline composition and dechlorinated during the process of the present invention, when the mixture is heated to the above mentioned temperatures following exit from the mixer, the PVC which has not been dechlorinated can discolor and be easily separable from the polyester.

In one embodiment, after the materials containing the polyvinyl chloride and polyester are mixed with an alkaline composition and heated, in order to separate the now dechlorinated polyvinyl chloride from the polyester, the materials can be washed with water. The dechlorinated polyvinyl chloride can float and can be easily separated from the submerged polyester. Also, it has been found that treating polyvinyl chloride with an alkaline composition in the above-described manner causes entrained air and other gas bubbles to have a higher tendency to adhere to the surface of the polyvinyl chloride, making the polyvinyl chloride even more buoyant. Consequently, when the polyvinyl chloride is being separated from the polyester in a liquid, gas bubbles, such as air, may be added to the liquid to increase separation efficiency. Of course, other separation techniques based on the differences in density between the polyester and the dechlorinated polyvinyl chloride may also be incorporated into the process.

Besides decreasing its density, the process of the present invention also darkens the color of the polyvinyl chloride and increases its melting point. Consequently, in another embodiment, the dechlorinated polyvinyl chloride can be separated from the polyester by visual inspection. Further, in yet another alternative embodiment, a mixture containing polyester and the dechlorinated polyvinyl chloride can be heated in order to melt the polyester. The heated mixture can then be fed to an extruder. Since the dechlorinated polyvinyl chloride has a much higher melting point than the polyester, the dechlorinated polyvinyl chloride can be captured on a screen prior to entering the extruder. In this embodiment, the polyvinyl chloride should be completely dechlorinated to prevent any chlorine from being given off when the polyester is melted.

Besides polyvinyl chloride, polyester collected from the solid waste stream is also typically mixed with pieces of aluminum. The aluminum can originate, for instance, from bottle caps associated with polyester containers or from the imperfect separation of plastic and aluminum cans found in discarded matter. Aluminum, similar to polyvinyl chloride, cannot easily be separated from polyester using a sink/float separation technique.

When contacted with an alkaline composition and provided with energy, as within the mixer of the present invention, aluminum can be converted to an alkali aluminum salt, which is typically water soluble. Thus, in one embodiment, an amount of alkaline composition can be added to materials containing polyester and aluminum sufficient to completely convert the aluminum to an aluminum salt. A fluid, such as water, can then be added to the mixture to dissolve the aluminum salt and separate it from the polyester.

According to the present invention, however, it has been found that in order to separate the aluminum from the polyester, it is not necessary to completely convert the aluminum into an aluminum salt. Instead, it has been found that reacting a portion of the aluminum with the alkaline composition can cause all of the aluminum pieces to become brittle. After adding energy, the materials containing the polyester and the aluminum can then be washed with a fluid such as water, preferably under shear conditions, causing the aluminum to be broken into small pieces. The small pieces can be separated from the polyester by passing the water mixture through a screen having a size sufficient to capture the larger polyester chips while allowing the smaller aluminum pieces to pass therethrough.

Consequently, when aluminum is present within the materials containing the polyester, the alkaline composition should be added to the materials in an amount sufficient to react with at least a portion of the aluminum, sufficient to make the aluminum brittle. Of course, the actual amount will depend upon the quantity of aluminum present in the materials and the size of the aluminum pieces.

Besides separating aluminum and PVC from polyester, the process of the present invention is also capable of removing various coatings adhered to polyester. In particular, the process of the present invention is capable of removing vapor barrier coatings and screen printed labels from polyester containers. Vapor barrier coatings are typically applied to beverage containers in order to prevent carbon dioxide escape when containing carbonated beverages and/or prevent oxygen incursion when containing liquids that could spoil in the presence of oxygen. Vapor barrier coatings can be made from saran, polyvinylidene chloride, or an acrylic. Screen printed labels, on the other hand, generally refer to inks that are directly applied to polyester containers, such as beverage containers. For instance, many soft drink containers are typically labeled with an epoxy based ink. In the past, many problems have been encountered in attempting to separate the polyester from these coatings and inks.

In order to remove the above-described coatings from polyester materials according to the present invention, the polyester is combined with the alkaline composition in an amount sufficient to saponify the outside surface of the polyester and mixed sufficiently to promote the saponification reaction. Any coatings adhered to the polyester become delaminated when the outside surface of the polyester is saponified. Once separated from the polyester, the coatings are further degraded while the materials are being heated. Specifically, solvents and liquids contained within the coatings are volatilized leaving behind some relatively smaller sized impurities. When the materials are later washed with water, the remaining insoluble impurities can be separated from the larger polyester chips using an appropriately sized screen that allows passage of the impurities while preventing passage of the polyester.

Besides various coatings, the process of the present invention is also effective in removing entrained organic and inorganic compounds that may have been absorbed by polyester materials. These compounds can include, for instance, toluene, gasoline, used motor oil, paint, pesticide residues, and other volatile compounds. The compounds can be absorbed by polyester when placed in contact therewith. For instance, consumers often misuse polyester food and beverage containers after the food or beverage has been consumed. Specifically, the containers are sometimes used to hold various organic and inorganic compounds and solvents. When attempting to recycle these polyesters, it is necessary to remove substantially all of the absorbed organic and inorganic compounds so that the polyester can be once again reused as a beverage container or food container.

According to the present invention, entrained organic and inorganic compounds that may be absorbed into polyester are released from the polymer during the saponification process. Specifically, the volatile organic and inorganic compounds are substantially removed during the heating steps, such as in a kiln. Less volatile compounds and compounds that slowly diffuse from polyester, on the other hand, are removed by first saponifying the outer surface of the polyester in the mixer and then evaporating any remaining organic and inorganic compounds in the subsequent heating steps. By removing substantially all of any entrained organic and inorganic compounds, "food grade" polyester is recovered which can be used in an unrestricted manner.

In summary, regardless of the impurities present, the process of the present invention includes contacting materials containing polyester with an alkaline composition, mixing the alkaline mixture and the polyester containing materials together such that the materials are substantially and evenly coated by the composition and partial saponification of the polyester occurs, heating the materials in a one or two step process to a temperature sufficient to chemically convert some of the impurities into a more separable form, and then washing the heated materials with a fluid, such as water. During washing, water buoyant contaminants can be separated from the polyester. Also, the water mixture can be passed through a screen in order to separate smaller sized impurities from the polyester.

Besides washing the heated materials with only water, in another embodiment, the heated materials can be washed according to a conventional mechanical recovery process as discussed above. For instance, after being heated, the materials containing the polyester can be mixed with a hot aqueous solution containing a surfactant or with a hot aqueous solution containing an alkaline composition and washed. If desired, the mixture can be heated under agitation during the wash cycle. Washing the materials can generally clean the polyester and can dissolve and break apart some of the impurities.

During the process, the portion of the polyester that is saponified is converted into a polyol and an acid salt. For instance, when saponifying PET with sodium hydroxide, the PET is converted into ethylene glycol and disodium terephthalate. The polyol that is formed during the process either remains as a liquid within the mixture or is evaporated if the mixture is heated above the boiling point of the polyol.

The formed acid salt or metal salt, such as disodium terephthalate, can dissolve in the water when the materials are washed. If desired, the metal salt can be later recovered from the wash water. For instance, if the acid salt is a terephthalate, the wash water can first be filtered in order to remove any undissolved impurities and contaminants. Next, the wash water can be acidified causing terephthalic acid to be precipitated. In order to acidify the solution, a mineral acid such as hydrochloric acid, phosphoric acid or sulfuric acid or an organic acid such as acetic acid or carbonic acid can be added to the solution. Once the terephthalic acid precipitates, the terephthalic acid can be filtered, washed and dried, leaving a relatively pure product.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process comprising:
   combining a mixture comprising contaminants and polyester with an alkaline composition to form a slurry;
   mixing said slurry in a mixer operating at a Froude number greater than about 4.2, wherein said mixing substantially coats said polyester with said alkaline composition and imparts sufficient energy to said slurry so as to promote a saponification reaction between said polyester and said alkaline composition; and
   saponifying only a portion of the polyester in the mixer during said mixing according to the saponification reaction.

2. The process of claim 1, further comprising heating said slurry to a first temperature following the saponification reaction to produce a dry product comprising the remaining polyester mixed with contaminants, wherein said first temperature is below the melting point of said polyester.

3. The process of claim 2, wherein said slurry is heated to a first temperature of between about 120° C. and about 170° C.

4. The process of claim 2, further comprising heating said dry product to a second temperature higher than said first temperature, wherein said second temperature is below the melting point of said polyester.

5. The process of claim 4, wherein said second temperature is between about 200° C. and about 240° C.

6. The process of claim 2, further comprising removing at least a portion of the contaminants from the dry product following the saponification of a portion of the polyester.

7. The process of claim 1, wherein said mixture comprises said contaminants entrained in said polyester.

8. The process of claim 1, wherein said mixture comprises said contaminants adhered to the surface of said polyester.

9. The process of claim 1, wherein said alkaline composition is combined with said mixture in a stoichiometric amount sufficient to react with no more than about 20% of the polyester.

10. The process of claim 1, wherein said alkaline composition is combined with said mixture in a stoichiometric amount sufficient to react with no more than about 10% of said polyester.

11. The process of claim 1, wherein said alkaline composition is combined with said mixture in an amount of less than about 10% by weight of said mixture.

12. The process of claim 1, wherein said alkaline composition comprises a metal hydroxide.

13. The process of claim 12, wherein said metal hydroxide is selected from the group consisting of sodium hydroxide, calcium hydroxide, potassium hydroxide, lithium hydroxide, magnesium hydroxide, or mixtures thereof.

14. The process of claim 13, wherein said alkaline composition consists essentially of sodium hydroxide and water.

15. The process of claim 14, wherein said alkaline composition consists essentially of sodium hydroxide and water in a ratio of 1:1.

16. The process of claim 12, wherein said metal hydroxide remaining in said slurry after said saponification is less than about 1% of the weight of said slurry.

17. The process of claim 12, wherein said metal hydroxide remaining in said slurry after said saponification is less than about 0.5% of the weight of said slurry.

18. The process of claim 1, wherein said mixer operates at a Froude number greater than about 6.6.

19. The process of claim 1, wherein the mixer is a plow mixer.

20. A process comprising:
   combining a mixture comprising contaminants and polyester with an alkaline composition to form a slurry, wherein said alkaline composition is in said slurry in an amount of less than about 10 % by weight of said mixture, said alkaline composition comprising at least one metal hydroxide in a stoichiometric amount sufficient to react with no more than about 20% of the polyester according to a saponification reaction between the metal hydroxide and the polyester; and
   mixing said slurry in a mixer operating at a Froude number greater than about 4.2, wherein said mixing substantially coats said polyester with said alkaline composition and imparts sufficient energy to said slurry so as to promote the saponification reaction between said metal hydroxide and said polyester;
   saponifying only a portion of the polyester in the mixer during the mixing according to the saponification reaction, wherein the residual metal hydroxide remaining in said slurry following said saponification reaction is less than about 0.5% by weight of said slurry;
   following said saponification reaction, heating said slurry to a first temperature to produce a dry product comprising the remaining polyester mixed with contaminants, wherein said first temperature is below the melting point of said polyester; and
   following said saponification reaction, heating said dry product to a second temperature higher than said first temperature, wherein said second temperature is below the melting point of said polyester.

21. The process of claim 20, wherein said slurry is heated to a first temperature of between about 120° C. and about 170° C.

22. The process of claim 20, wherein said second temperature is between about 20° F. and about 240° F.

23. The process of claim 20, wherein said mixture comprises said contaminants entrained in said polyester.

24. The process of claim 20, wherein said mixture comprises said contaminants adhered to the surface of said polyester.

25. The process of claim 20, wherein said alkaline composition consists essentially of sodium hydroxide and water.

26. The process of claim 20, wherein said residual metal hydroxide remaining in said slurry following said saponification reaction is less than about 0.1% by weight of said slurry.

27. The process of claim 20, wherein said mixer operates at a Froude number greater than about 6.6.

28. The process of claim 20, wherein said mixer operates at a Froude number greater than about 9.5.

29. The process of claim 20, wherein said mixer is a plow mixer.

30. A process comprising:
   combining a mixture containing polyester and polyvinyl chloride with an alkaline composition comprising at least one metal hydroxide to form a slurry;
   mixing said slurry in a mixer operating at a Froude number greater than about 4.2, wherein said mixing substantially coats said polyester and said polyvinyl chloride with said alkaline composition and imparts sufficient energy to said slurry so as to promote a dechlorination reaction between the alkaline composition and the polyvinyl chloride and so as to promote a saponification reaction between the alkaline composition and the polyester;

dechlorinating the polyvinyl chloride in the mixer during the mixing according to the dechlorination reaction; and saponifying only a portion of the polyester in the mixer during the mixing according to the saponification reaction.

31. The process of claim 30, wherein said alkaline composition is combined with said mixture in an amount of less than about 10% by weight of said mixture.

32. The process of claim 30, wherein said metal hydroxide is selected from the group consisting of sodium hydroxide, calcium hydroxide, potassium hydroxide, lithium hydroxide, magnesium hydroxide, or mixtures thereof.

33. The process of claim 30, wherein said alkaline composition consists essentially of sodium hydroxide and water.

34. The process of claim 30, wherein said mixer operates at a Froude number greater than about 6.6.

35. The process of claim 30, wherein said mixer is a plow mixer.

36. A process comprising:
combining a mixture containing polyester and aluminum with an alkaline composition comprising at least one metal hydroxide to form a slurry;
mixing said slurry in a mixer operating at a Froude number greater than about 4.2, wherein said mixing substantially coats said polyester and said aluminum with said alkaline composition and imparts sufficient energy to said slurry so as to promote reaction of said alkaline composition with said aluminum and so as to promote a saponification reaction between the alkaline composition and the polyester; and converting said aluminum into a form separable from said polyester in the mixer during the mixing according to the reaction of the alkaline composition with the aluminum; and saponifying only a portion of the polyester in the mixer during the mixing according to the saponification reaction.

37. The process of claim 36, wherein said alkaline composition is combined with said mixture in an amount of less than about 10% by weight of said mixture.

38. The process of claim 36, wherein said metal hydroxide is selected from the group consisting of sodium hydroxide, calcium hydroxide, potassium hydroxide, lithium hydroxide, magnesium hydroxide, or mixtures thereof.

39. The process of claim 36, wherein said alkaline composition consists essentially of sodium hydroxide and water.

40. The process of claim 36, wherein said mixer operates at a Froude number greater than about 6.6.

41. The process of claim 36, wherein said mixer is plow mixer.

* * * * *

UNITED STATES PATENT AND TRADEMARK OFFICE
CERTIFICATE OF CORRECTION

PATENT NO.         : 7,070,624 B2
APPLICATION NO.    : 10/174760
DATED              : July 4, 2006
INVENTOR(S)        : John Mitchell Holmes, III and Richard Philip Zink It is certified that error appears in the above-identified patent and that said Letters Patent is hereby corrected as shown below:

Column 14, line 42

"perature is between about 20° F and about 240° F." should be --perature is between 200° F and about 240° F.--

Signed and Sealed this

Twenty-sixth Day of September, 2006

JON W. DUDAS
*Director of the United States Patent and Trademark Office*